(12) United States Patent
Roux et al.

(10) Patent No.: US 7,538,453 B1
(45) Date of Patent: May 26, 2009

(54) FAN POWER SUPPLY SYSTEM

(75) Inventors: Phillip Roux, Sutton, MA (US); Robert M. Beauchamp, Milford, MA (US); Kenneth Fife, Sturbridge, MA (US)

(73) Assignee: EMC Corporation, Hopkinton, MA (US)

( * ) Notice: Subject to any disclaimer, the term of this patent is extended or adjusted under 35 U.S.C. 154(b) by 277 days.

(21) Appl. No.: 11/690,165

(22) Filed: Mar. 23, 2007

(51) Int. Cl.
*H02J 1/00* (2006.01)
*H02J 3/38* (2006.01)
*G05F 1/00* (2006.01)
*G05F 1/46* (2006.01)
*G05B 9/02* (2006.01)
*G05B 9/03* (2006.01)
*G05B 23/02* (2006.01)
*G05B 11/18* (2006.01)
*B25J 19/00* (2006.01)

(52) U.S. Cl. .............................. 307/86; 307/52; 323/268; 323/349; 318/563; 318/564; 318/565; 318/568.24; 318/594

(58) Field of Classification Search ................. 318/563, 318/564, 565, 568.24, 594; 323/268, 349; 307/52, 85, 86
See application file for complete search history.

(56) References Cited

U.S. PATENT DOCUMENTS 5,831,405 A * 11/1998 Massie ........................ 318/471
6,368,064 B1 * 4/2002 Bendikas et al. ................ 417/2
6,814,546 B2 * 11/2004 Sekiguchi ....................... 417/3
6,822,419 B2 * 11/2004 Horng et al. ................. 318/825
6,922,038 B2 * 7/2005 Horng et al. ................. 318/825
6,949,900 B1 * 9/2005 Berringer ............... 318/400.03
6,992,404 B2 * 1/2006 Priest ........................... 307/80
7,127,621 B2 * 10/2006 Wierzbicki et al. .......... 713/300
7,154,723 B1 * 12/2006 Warnakulasooriya et al. . 361/62
2003/0197483 A1 * 10/2003 Horng et al. ................. 318/825
2004/0123165 A1 * 6/2004 Wierzbicki et al. .......... 713/300

* cited by examiner

*Primary Examiner*—Akm E Ullah
*Assistant Examiner*—Jue Zhang

(57) ABSTRACT

A fan power supply system having a pair of voltage supplies, one producing a higher voltage than the other. A switch selects one of the voltage supplies in response to a control signal. A DC/DC converter is connected to the selected one of the voltage supplies for producing a current greater than current fed to the DC/DC converter by the selected one of the voltage supplies. A fan is fed by the current produced by the DC/DC converter. The fan produces a train of pulses representative of the rotational speed of the fan. A microcontroller encodes the train of pulses produced by the fan as a function of whether the selected one of the pair of voltages has the higher voltage or the lower voltage. A decoder produces the control signal in accordance with the encoding by the microcontroller.

5 Claims, 3 Drawing Sheets

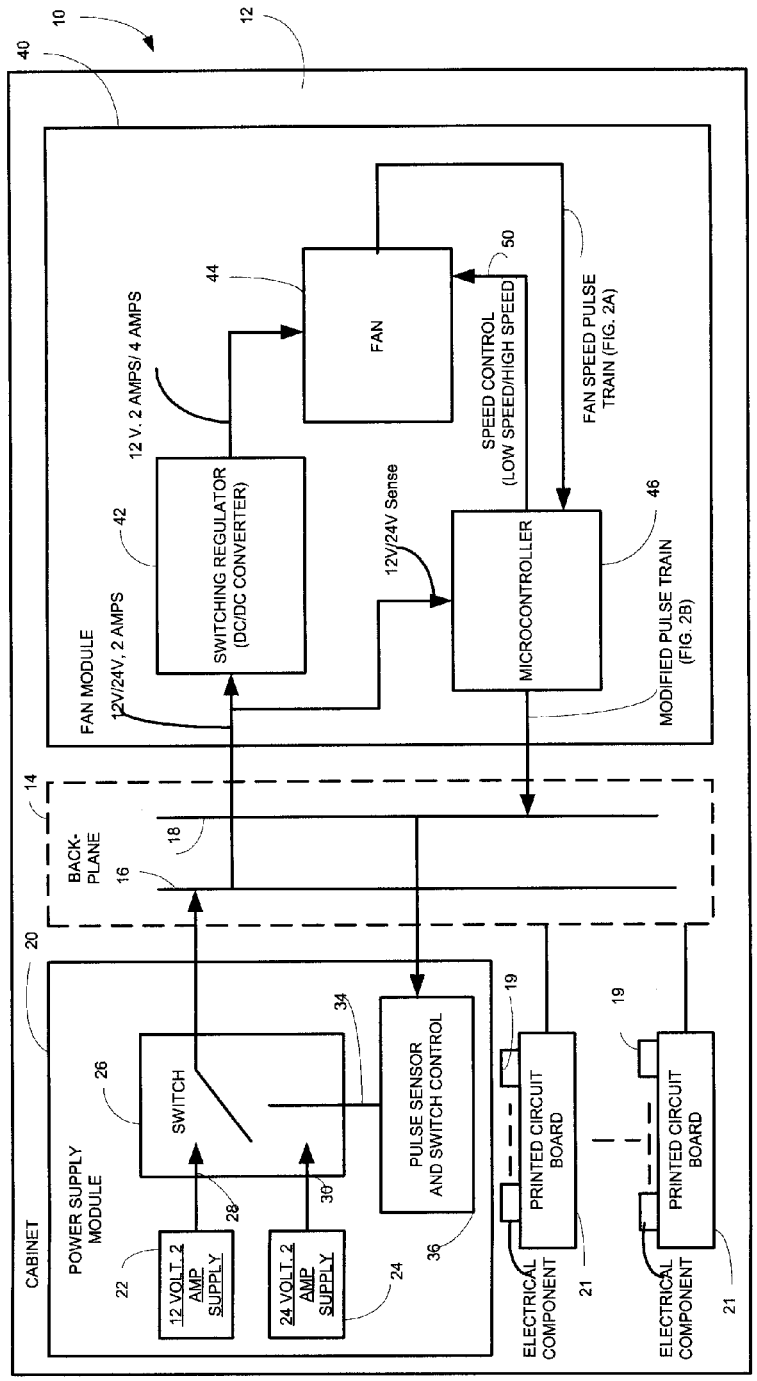
FIG. 2
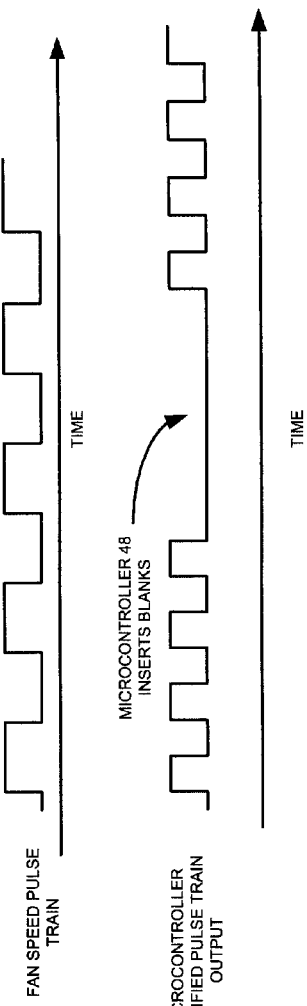
FIG. 2A
FIG. 2B

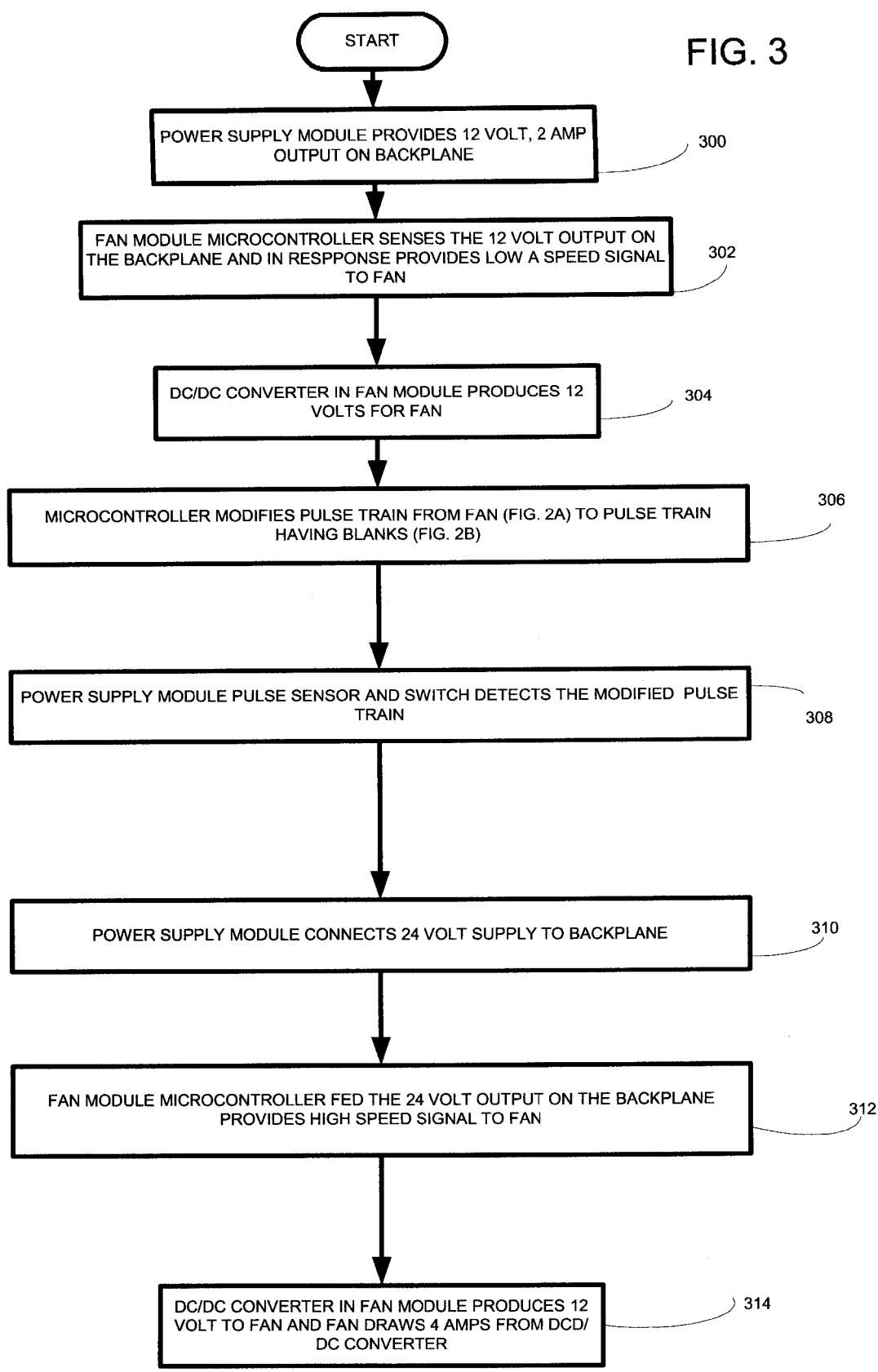

FAN POWER SUPPLY SYSTEM

TECHNICAL FIELD

This invention relates generally to fan power supply systems, and more particularly to power supply systems used to cool the interior of electrical cabinets having a backplane to interconnect electrical components and fan modules.

BACKGROUND

As is known in the art, cabinets, such as those used to store electrical components require internal cooling. Typically fans are used to blow air from outside the cabinet into the cabinet and over the electrical components and then exhaust the air.

In some such cabinets the electrical components are electrically interconnected in the cabinet through an internal backplane. In many cases, the system operates with a single voltage (e.g., +12V) power source. Further, the current carrying capacity of the backplane is typically determined by the requirements of the system.

One such system is shown in FIG. 1. Here, a power supply module is connected to a fan through a backplane. Also connected to the backplane are other electrical components here mounted to printed circuit boards that plug into the backplane. The power supply module includes, in this example, a 12 volt, 2 amp power supply. A fan module having a fan for cooling the electrical components is powered by the 12 volt 2 amp power supply, it being noted that the backplane is in this example designed to handle a maximum of 2 amps of current. The fan produces a pulse train shown in FIG. 1A having a frequency or pulse repetition rate, proportional to the fan's rotational speed. Such information is useful in controlling the fan and for monitoring whether the fan is operating properly. In any event, the speed of the fan is monitored by a pulse sensor in the power supply module.

As is also known systems may be designed to be expanded in capacity or processing power. For example, with a data storage system, it may be required to increase the storage capacity or processor capability. That is, it may be required to have additional components plugged into the backplane, or raise the power dissipation of replacement upgrade components. Increasing the capacity of the system results in higher cooling requirements within the cabinet i.e., increased power for the fans. Since in many systems, the fans are powered by the voltages on the backplane. Thus, the increase in capacity may result in the backplane having to handle more current for the additional cooling than the original maximum current handling capacity of the backplane. Replacement of the backplane to accommodate this increased current handling capacity may be impractical and costly.

SUMMARY

In accordance with the present invention, a fan power supply system is provided having a pair of voltage supplies, one of the pair of voltage supplies producing a higher voltage than the other one of the pair of voltage supplies. The system includes switch for selecting one of the pair of the voltage supplies in response to a control signal. A DC/DC converter is connected to the selected one of the pair of voltages supplies for producing a current greater than current fed to the DC/DC converter by the selected one of the pair of voltage supplies. A fan is fed by the current produced by the DC/DC converter, such fan producing a train of pulses representative of the rotational speed of the fan. A microcontroller is provided for encoding the train of pulses produced by the fan as a function of whether the selected one of the pair of voltages has the higher voltage or the lower voltage. A decoder is provided for producing the control signal in accordance with the encoding by the microcontroller.

In one embodiment, the microcontroller produces either a low speed control signal to the fan when the selected one of the pair of voltage supplies has the lower voltage or producing a high speed control signal to the fan when the selected one of the pair of voltage supplies has the higher voltage.

In accordance with another feature of the invention, a method is provided for operating a fan. The method includes: operating the fan with a relatively low voltage; driving the fan at a relatively low speed in response to the relatively low voltage, such fan drawing a relatively low current; modifying a train of fan speed indicating pulses produced by the fan; sensing the modified pulse train and in response to the sensed modified pulse train: passing a relatively high voltage supply having a relatively low current output to a converter, such converter converting the relatively high voltage supply to a relatively low voltage, such converted voltage being fed to drive the fan; and, producing a high speed control signal to the fan in response to the connected relatively high voltage, such fan drawing a relatively high current from the converter.

In one embodiment, a fan power supply is provided having a backplane. A power module is connected to the backplane, such power module comprising: (i) a pair of voltage supplies, one of the pair of voltage supplies producing a higher voltage than the other one of the pair of voltage supplies; (ii) a switch for connecting a selected one of the pair of the voltage supplies to the backplane in response to a control signal; and, (iii) a pulse sensor and switch control connected to the backplane, for producing the control signal. The system includes a fan module connected to the backplane, such fan module comprising: (i) a DC/DC converter connected through the backplane to the selected one of the pair of voltages supplies, such DC/DC converter having on output current capacity greater than current fed to the input of the DC/DC converter by the selected one of the pair of voltage supplies; (ii) a fan fed by the current produced by the DC/DC converter, such fan for producing a train of pulses representative of the rotational speed of the fan; (iii) a microcontroller fed by the selected one of the pair of voltage supplies for: modifying the train of pulses produced by the fan when the selected one of the pair of voltages has the higher voltage; and for producing a low speed control signal to the fan when the selected one of the pair of voltage supplies has the lower voltage or producing a high speed control signal to the fan when the selected one of the pair of voltage supplies has the higher voltage. The pulse sensor and switch control produces the control signal to select the one of the pair of voltage supplies having the higher voltage when the train of pulses produced by the fan is modified by the microcontroller.

With such an arrangement, the backplane handles a relatively low current while the DC/DC converter is able to supply a relatively high current to the fan thereby increasing the cooling capacity of the fan without changing the current handling capacity of the backplane.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a diagram of a fan power supply system according to the invention:

FIG. 2A is a timing diagram of a train of pulses produced by a fan controlled by the system of FIG. 2, such train of pulses indicating fan rotational speed;

FIG. 2B is a timing diagram of a train of pulses produced by a microcontroller of the fan power supply system of FIG. 2 in responses to the train of pulses produced by a fan in the system of FIG. 2; and FIG. 3 is a flowchart of the operation of the fan power system of FIG. 2.

Like reference symbols in the various drawings indicate like elements.

DETAILED DESCRIPTION

Figure 1:
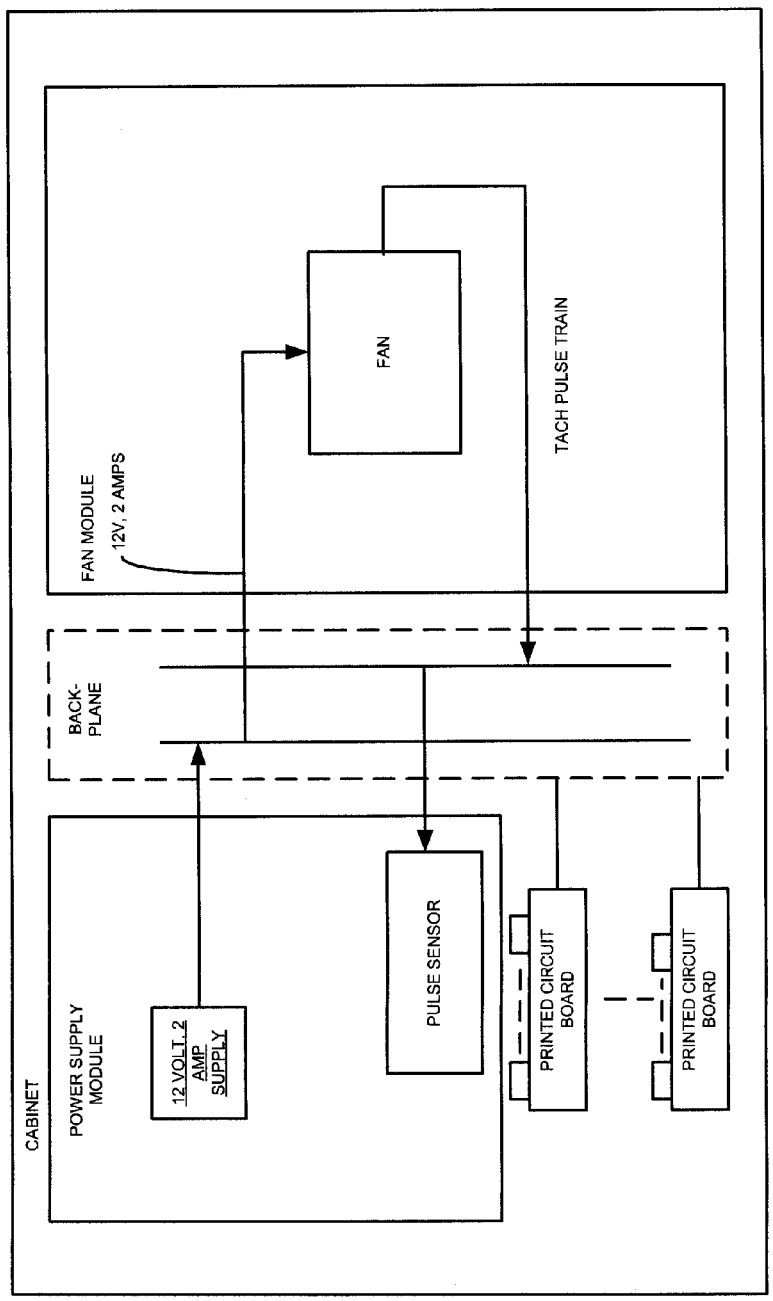
FIG. 1 is a diagram of a fan power supply system according to the PRIOR ART.
Figure 1A:
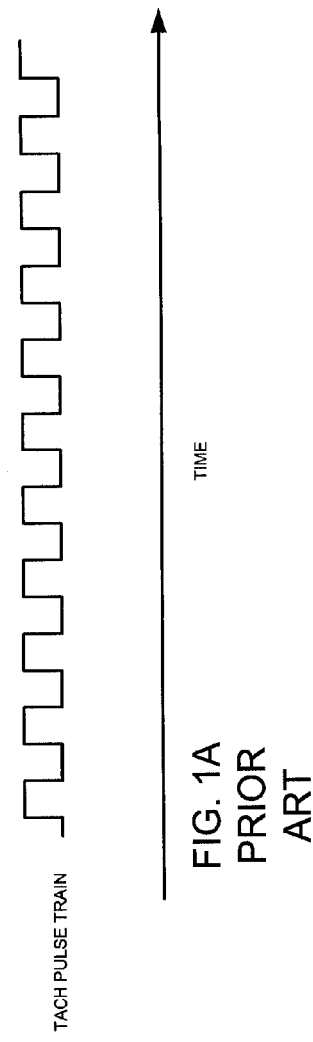
FIG. 1A is a timing diagram of a train of pulses produced by a fan controlled by the system of FIG. 1, such train of pulses indicating fan rotational speed.

Referring now to FIG. 2, a fan power supply system 10 is shown disposed in an electrical cabinet 12. The fan power supply system 10 includes a backplane 14 having a plurality of conductors, an exemplary two such of conductors 16, 18 being shown. A power module 20 is connected to the backplane 14 along with printed circuit boards 20 having electrical components 22 thereon. The power supply module 20 includes a pair of voltage supplies 22, 24 producing different voltages. A first one of the pair of voltage supplies, here supply 22, produces a lower voltage, here for example, +12 volts, than a voltage produced by a second one of the pair of voltage supplies 24, here producing +24 volts. The voltage supplies 22, 24 have the same current output capacity, here, for example. 2 amps. It is noted that the current handling capacity of the backplane 14 is here the same as the current output capacity of the voltage supplies 22, 24; thus, here for example, the current handling capacity of the backplane 14 is here 2 amps.

The power supply module 20 has a switch 26 having a pair of input terminals 28, 30. Each one of the input terminals 28, 30 is connected to a corresponding one of the pair of voltage supplies 22, 24, respectively as shown. The switch 26 is fed a control signal on line 34 to connect the first one of the voltages sources 22 to a first one of the plurality of conductors 16 of the backplane 14 when the control signal is in a first condition or to connect the second one of the voltages sources 24 to the first one of the plurality of conductors 16 of the backplane 14 when the control signal is in a second condition;

The power supply module 20 also includes a pulse sensor and switch control 36 connected to a second one of the plurality of conductors of the backplane, here conductor 18, for producing the control signal on line 34 in accordance with a train of pulses fed to the pulse sensor and switch control 36 through the second one of the plurality of conductors 18 of the backplane 14.

The fan power supply system 10 includes a fan module 40 connected to the backplane 14. The fan module 40 includes a DC/DC converter 42 having an input connected to the first one of the plurality of conductors 16 of the backplane 14 to receive either the voltage produced by a first one of the pair of voltage supplies 22 or the higher voltage produced by the second one of the pair of voltage supplies 24 selectively in accordance with the condition of the control signal on line 34 fed to the switch 26 of the power supply module 20 and for receiving the same output current produced by either one of the pair of voltage supplies 22, 24. The DC/DC converter 42 is able to produce at an output thereof a current greater than the current fed to the input of the DC/DC converter 42 by either one of the pair of voltage supplies 22, 24. That is, the DC/DC converter 42 has an output current capacity greater than the current fed to the input of the DC/DC converter 42 by either one of the pair of voltage supplies 22, 24. Here, for example, the DC/DC converter 42 here has a 4 amp current output capacity and produces here +12 volts.

The fan module 40 includes a fan 44 fed by the current produced at the output of the DC/DC converter 42 to rotate the fan. The fan 44 produces a train of pulses, shown on FIG. 2A, representative of the rotational speed of the fan.

The fan module 40 also includes a microcontroller 46 fed by the voltage on the first one of the plurality of conductors 16 of the backplane 14 and having an output connected to the second one of the plurality of conductors 18 of the backplane 14. The microcontroller 46 produces the pulse train on the second one of the plurality of conductors 18 of the backplane 14 for the pulse sensor and switch control 36 by modifying, in effect encoding, the train of pulses produced by the fan (FIG. 2A) into the train of pulses shown in FIG. 2B when the second one of the pair of voltage supplies 24 is connected to the first one of the plurality of conductors 16 of the backplane 14. Here, the microcontroller 46 modifies the pulses produced by the fan 44 by periodically blanking pulses produced by the fan, as shown in FIG. 2B. The microcontroller 46 also produces either a low speed control signal to the fan on line 50 when the first one of the pair of voltage supplies 22 is connected to the first one of the plurality of conductors 16 of the backplane 14 or produces a high speed control signal to the fan on line 50 when the second one of the pair of voltage supplies 24 is connected to the first one of the plurality of conductors 16 of the backplane 14. The pulse sensor and switch control 36 produces the control signal on line 34 with the first condition such when such pulse sensor and switch control 36 senses the modified train of pulses to thereby connect the higher voltage source 24 to conductor 16; otherwise, the pulse sensor and switch control 36 produces the control signal with the second condition resulting in the low voltage supply 22 being connected to conductor 16.

It should be noted that the basic rpm algorithm used to control fan speed is a pulse count over unit time. i.e., the number of pulses produced by the fan over a fixed, predetermined period of time whether the fan is of the type used in the PRIOR ART of FIG. 1, or the fan used in FIG. 2. So for the power supply monitoring the PRIOR ART, it is assumed that a minimum number of pulses are to transition over the predetermined period of time period. With the fan in FIG. 2, with the microcontroller adding blanking pulses the number of pulses over the predetermined period of time is reduced from that produced by the fan in FIG. 1. To compensate for this difference, the microcontroller also provides retiming of the pulse count over the predetermined period by increasing the pulse repetition frequency as indicated in FIG. 2A. In this way, the effective number of pulses, hence rpm will be maintained the same as that for the fan of the type used in the PRIOR ART of FIG. 1, Referring to FIG. 3, a flowchart of the operation of the fan power system is shown. Briefly, the relatively low voltage supply is fed to the DC/DC converter and to the microcontroller. The fan is operated a relatively low voltage, relatively low current by the converter and hence the fan is driven at a relatively low speed, drawing a relatively low current. The train of fan speed indicating pulses is modified by the microcontroller. The pulse sensor and switch control senses the modified pulse train and in response to the sensed modified pulse train: passes a relatively high voltage supply having a relatively low current output to the DC/DC converter. The DC/DC converter converts the relatively high voltage supply to a relatively low voltage, such converted voltage being fed to drive the fan. The microcontroller produces a high speed control signal to the fan in response to the connected relatively high voltage with the fan now drawing a relatively high current from the converter.

More particularly, referring also to FIG. 3, the power supply module 20 (FIG. 2) provides here +12 volts and 2 amps on the backplane, Step 300. The fan module microcontroller 46 is fed the 12 volts and in response thereto provides a lower speed pulse width modulated signal to the fan on line 50, Step 302. The DC/DC converter 42 produces 12 volts for the fan 44 and the low speed operating fan 44 draws 2 amps from the converter 42, Step 304. The fan 44 produces a pulse train, as shown in FIG. 2A. The microcontroller 46 modifies the pulse train by in this example, by periodically blanking pulses as shown in FIG. 2B, Step 306. The modified pulse train is fed over the backplane to, and is detected by, the pulse sensor and switch control, Step 308. In response to the modified pulse train, the pulse sensor and switch changes the condition of the control signal to the switch to operate the switch and disconnect the 12 volt supply 22 from the backplane while connecting the 24 volt supply 24 to the conductor 16 of the backplane, Step 310. Here, again, the backplane draws a maximum of 2 amps. The 24 volts on the backplane is fed to the DC/DC converter 42 and the DC/DC converter 42 produces a 12 volt output and the microcontroller 46 in response to the sensed 24 volts on the conductor 16 of backplane 14 backplane increases the speed of the fan resulting in the fan drawing 4 amps from the converter 42, Steps 312 and 314.

It should be noted that if the fan module 40 in FIG. 2 were replaced with the prior art fan module show in FIG. 1, with the backplane having the power supply module 20 of FIG. 2, the power supply module pulse sensor and control 20 would detect an unmodified pulse train from the prior art fan module and the fan in the prior art fan module would be supplied with +12 volts.

A number of embodiments of the invention have been described. Nevertheless, it will be understood that various modifications may be made without departing from the spirit and scope of the invention. Accordingly, other embodiments are within the scope of the following claims.

What is claimed is:

1. A fan power supply system, comprising:
a pair of voltage supplies, one of the pair of voltage supplies producing a higher voltage than the other one of the pair of voltage supplies;
a switch for selecting one of the pair of the voltage supplies in response to a control signal;
a DC/DC converter connected to the selected one of the pair of voltages supplies for producing a current greater than current fed to the DC/DC converter by the selected one of the pair of voltage supplies;
a fan fed by the current produced by the DC/DC converter, such fan producing a train of pulses representative of the rotational speed of the fan;
a microcontroller for encoding the train of pulses produced by the fan as a function of whether the selected one of the pair of voltages has the higher voltage or the lower voltage;
a decoder for producing the control signal in accordance with the encoding by the microcontroller.

2. The fan power supply system recited in claim 1 wherein the microcontroller produces either a low speed control signal to the fan when the selected one of the pair of voltage supplies has the lower voltage or producing a high speed control signal to the fan when the selected one of the pair of voltage supplies has the higher voltage.

3. A method for operating a fan, comprising:
operating the fan with a relatively low voltage;
driving the fan at a relatively low speed in response to the relatively low voltage, such fan drawing a relatively low current;
modifying a train of fan speed indicating pulses produced by the fan selectively in accordance with whether the fan is operating with the relatively low voltage or with a voltage from a relatively high voltage supply;
sensing the modified pulse train and in response to the sensed modified pulse train:
passing the relatively high voltage supply having a relatively low current output to a converter, such converter converting the relatively high voltage supply to a relatively low voltage, such converted voltage being fed to drive the fan;
producing a high speed control signal to the fan in response to the connected relatively high voltage, such fan drawing a relatively high current from the converter.

4. A fan power supply system, comprising:
(a) a backplane;
(b) a power module connected to the backplane, such power module comprising:
(i) a pair of voltage supplies, one of the pair of voltage supplies producing a higher voltage than the other one of the pair of voltage supplies;
(ii) a switch for connecting a selected one of the pair of the voltage supplies to the backplane in response to a control signal;
(iii) a pulse sensor and switch control connected to the backplane, for producing the control signal;
(c) a fan module connected to the backplane, such fan module comprising:
(i) a DC/DC converter connected through the backplane to the selected one of the pair of voltages supplies, such DC/DC converter having an output current capacity than the current fed to the DC/DC converter by the selected one of the pair of voltage supplies;
(ii) a fan fed by the current produced by the DC/DC converter, such fan for producing a train of pulses representative of the rotational speed of the fan;
(iii) a microcontroller fed by the selected one of the pair of voltage supplies for:
modifying the train of pulses produced by the fan when the selected one of the pair of voltages has the higher voltage; and
for producing a low speed control signal to the fan when the selected one of the pair of voltage supplies has the lower voltage or producing a high speed control signal to the fan when the selected one of the pair of voltage supplies has the higher voltage; and
(d) wherein the pulse sensor and switch control produces the control signal to select the one of the pair of voltage supplies having the higher voltage when the train of pulses produced by the fan is modified by the microcontroller.

5. A fan power supply system, comprising:
(a) a backplane having a plurality of conductors;
(b) a power module connected to the backplane, such power module comprising:
a pair of voltage supplies producing different voltages, a first one of the pair of voltage supplies producing a lower voltage than a voltage produced by a second one of the pair of voltage supplies;
a switch having a pair of input terminals, each one of the input terminals being connected to a corresponding one of the pair of voltage supplies, such switch being fed a control signal to connect the first one of the voltages sources to a first one of the plurality of conductors of the backplane when the control signal is in a first condition or to connect the second one of the voltages sources to the first one of the plurality of conductors of the backplane when the control signal is in a second condition;

a pulse sensor and switch control connected to a second one of the plurality of conductors of the backplane, for producing the control signal in accordance with a train of pulses fed to the pulse sensor and switch control through the second one of the plurality of conductors of the backplane;

(c) a fan module connected to the backplane, such fan module comprising:

a DC/DC converter having an input connected to the first one of the plurality of conductors of the backplane to receive either the voltage produced by a first one of the pair of voltage supplies or the higher voltage produced by the second one of the pair of voltage supplies selectively in accordance with the condition of the control signal fed to the switch of the power supply module, such DC/DC converter having an output current capacity current greater than current fed to the input of the DC/DC converter by either one of the pair of voltage supplies;

a fan fed by the current produced at the output of the DC/DC converter to rotate the fan, such fan produces a train of pulses representative of the rotational speed of the fan;

a microcontroller fed by the voltage on the first one of the plurality of conductors of the backplane and having an output connected to the second one of the plurality of conductors of the backplane, for:

producing the pulse train on the second one of the plurality of conductors of the backplane for the pulse sensor and switch control by modifying the train of pulses produced by the fan when the second one of the pair of voltage supplies is connected to the first one of the plurality of conductors of the backplane; and producing a low speed control signal to the fan when the first one of the pair of voltage supplies is connected to the second one of the plurality of conductors of the backplane or producing a high speed control signal to the fan when the second one of the pair of voltage supplies is connected to the second one of the plurality of conductors of the backplane;

(e) wherein the pulse sensor and switch control producing the control signal with the second condition such when such pulse sensor and switch control senses the modified train of pulses; otherwise, the pulse sensor and switch control produces the control signal with the first condition.

* * * * *